United States Patent
Okajima et al.

(10) Patent No.: US 7,224,954 B2
(45) Date of Patent: May 29, 2007

(54) METHOD AND DEVICE FOR COMMUNICATING VIA AN AD-HOC WIRELESS NETWORK

(75) Inventors: Ichiro Okajima, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 973 days.

(21) Appl. No.: 09/748,243

(22) Filed: Dec. 27, 2000

(65) Prior Publication Data

US 2001/0018336 A1  Aug. 30, 2001

(30) Foreign Application Priority Data

Dec. 28, 1999 (JP) ............................. 11-375796

(51) Int. Cl.
*H04Q 7/20* (2006.01)
*H04B 15/00* (2006.01)

(52) U.S. Cl. ..................... 455/403; 455/502; 455/524; 379/90.1

(58) Field of Classification Search ................. 455/403, 455/445, 502, 507, 517, 524, 525; 379/90.1
See application file for complete search history.

(56) References Cited

U.S. PATENT DOCUMENTS 5,822,701 A * 10/1998 Tomisato et al. ........... 455/502
5,907,540 A    5/1999 Hayashi
6,021,125 A *  2/2000 Sakoda et al. .............. 370/345
6,377,805 B1 * 4/2002 Anvekar et al. ............ 455/436

FOREIGN PATENT DOCUMENTS

| DE | 43 26 523 | 2/1995 |
| EP | 0 501 808 | 9/1992 |
| JP | 8-47046 | 2/1996 |
| JP | 8-275245 | 10/1996 |

* cited by examiner

*Primary Examiner*—Erika A. Gary
*Assistant Examiner*—S. Smith
(74) *Attorney, Agent, or Firm*—Oblon, Spivak, McClelland, Maier & Neustadt, P.C.

(57) ABSTRACT

A communication method used when a mobile station receives a signal from a base station in a mobile communication system is provided. The method includes the steps of: deciding one or a plurality of mobile stations which can communicate with the mobile station via a predetermined wireless network and which can receive a signal from the base station; the one or a plurality of mobile stations sending a signal destined for the mobile station received from the base station to the mobile station via the predetermined wireless network; and the mobile station synthesizing a signal received from the base station and the signal destined for the mobile station received from the one or a plurality of mobile stations.

13 Claims, 14 Drawing Sheets

METHOD AND DEVICE FOR COMMUNICATING VIA AN AD-HOC WIRELESS NETWORK

BACKGROUND OF THE INVENTION

1. Field of the Invention

The present invention relates to a communication method of a mobile communication system. More particularly, the present invention relates to a communication method when a mobile station receives a signal from a base station in the mobile communication system by diversity reception.

In addition, present invention relates to a mobile station which carries out communications according to the communication method.

2. Description of the Related Art

FIG. 1 shows an example of a conventional mobile communication system.

As shown in FIG. 1, this mobile communication system is configured by a hierarchical structure wherein radio network controllers 60, 80 control a plurality of base stations 40, 41, 42, 43 which are placed in communication service areas and a switch 100 controls the radio network controllers 60, 80.

For example, a mobile station 18 which resides in a wireless zone of the base station 43 communicates with the base station 43 and communicates with another mobile station via the radio network controller 80, the switch 100 and a predetermined network (which is not shown in the figure).

The mobile station 18 receives a signal from the base station 43 according to the antenna diversity reception method for example. According to the antenna diversity reception method, the error rate of received signals at the mobile station 18 can be decreased by synthesizing signals received by a plurality of antennas and by selecting a signal which is received by an antenna which is in better receiving condition.

In addition, the mobile station 19 which resides in a boundary part between the wireless zone of the base station 40 and the wireless zone of the base station 41 receives signals from the base stations 40, 41 according to a site diversity reception method. According to the site diversity reception method, the mobile station 19 receives same signals each of which signals are sent by the base stations 40 and 41 respectively. Then, the mobile station 19 synthesizes and selects the signals so that the error rate can be decreased.

In the communication method according to the antenna diversity reception method, the interval between antennas becomes smaller as the mobile station (a cellular phone and the like) becomes smaller. As a result, the correlation between receiving systems connected to the antennas becomes high so that large effect of diversity can not be expected.

According to the site diversity reception method, when the mobile station resides in a boundary part of the wireless zones, the effect of the method can be obtained. However, when the mobile station resides in a central part of a wireless zone of a base station, attenuation of signals from another base station becomes large so that the effect of the diversity reception can not be obtained. Thus, it is necessary to install base stations in higher density for realizing effective site diversity reception. That is, it is necessary to increase the number of base stations which should be installed in the communication service area so that a cost of communication equipment increases.

SUMMARY OF THE INVENTION

It is a first object of the present invention to provide a communication method in a mobile communication system for enabling effective site diversity reception regardless of the physical size of the mobile stations and placement of the base stations.

It is a second object of the present invention to provide a mobile station which performs communication according to the communication method.

The above first object of the present invention is achieved by a communication method used when a mobile station receives a signal from a base station in a mobile communication system, comprising the steps of:

deciding one or a plurality of mobile stations which can communicate with the mobile station via a predetermined wireless network and which can receive a signal from the base station;

the one or a plurality of mobile stations sending a signal destined for the mobile station received from the base station to the mobile station via the predetermined wireless network; and the mobile station synthesizing a signal received from the base station and the signal destined for the mobile station received from the one or a plurality of mobile stations.

According to the method in the mobile communication system, since signals destined for the mobile station which are received by the one or a plurality of mobile stations from the base station can be aggregated in the mobile station, the mobile station can perform diversity reception of the signal destined for the mobile station from the base station by synthesizing a signal received from the base station and the aggregated signals.

In terms of providing a concrete method of deciding the one or a plurality of mobile stations which sends signals destined for the mobile station, the above method may further includes the steps of:

forming the predetermined wireless network by the mobile station and other mobile stations in the mobile communication system;

selecting the one or a plurality of mobile stations among the other mobile stations as mobile stations for diversity reception; and the one or a plurality of mobile stations selected as used for diversity reception of the mobile station sending the signal destined for the mobile station received from the base station to the mobile station via the predetermined wireless network.

In terms of decreasing error rate of receiving signals received by diversity reception, the above method may further includes the steps of:

selecting the one or a plurality of mobile stations among the other mobile stations such that communication condition between the one or a plurality of mobile stations and the base station is better than predetermined condition.

According to the above method, signals destined for the mobile station which are received by the one or a plurality of mobile stations from the base station can be aggregated in the mobile station in which communication condition between the base station and the one or a plurality of mobile stations is good.

The communication condition depends on a state of the wireless channel between the base station and a mobile station. The state of the wireless channel depends on a distance to the base station (distance of the wireless channel), reflection by a building, radio attenuation, radio interference by other communication nodes and the like. For example, the state of the wireless channel can be represented by signal receiving level, signal error rate, receiving level of interference wave and the like.

In terms of obtaining the communication state between the base station and the one or a plurality of mobile stations, the above method may further includes the steps of:

selecting the one or a plurality of mobile stations among the other mobile stations such that each level of signals received from the base station by the one or a plurality of mobile stations is higher than a predetermined level.

In terms of providing a concrete method for the mobile station to recognize the one or a plurality of mobile stations which operate for diversity reception of the mobile station, the above method may further includes the steps of:

the mobile station sending participation requests which are requests to operate for diversity reception of the mobile station, to the one or a plurality of mobile stations via the predetermined wireless network;

each mobile station which receives the participation request determines whether the each mobile station can receive a signal from the base station;

each mobile station which can receive a signal from the base station recognizing that the each mobile station operates for diversity reception of the mobile station which sends the participation request, and sending a participation response which indicates acceptance of the participation request to the mobile station via the predetermined wireless network; and the mobile station recognizing that the each mobile station which sends the participation response operates for diversity reception of the mobile station.

In terms of selecting the one or a plurality of mobile stations such that the mobile station can perform diversity reception with lower error rate, the above method may further includes the steps of:

the each mobile station which receives the participation request measuring a state of receiving a signal from the base station;

the each mobile station in which the state is better than a predetermined state recognizing that the each mobile station operate for diversity reception of the mobile station and sending the reception response to the mobile station via the predetermined wireless network.

In the above method, the predetermined wireless network may be a mobile ad-hoc network.

The above second object of the present invention is achieved by a mobile station which receives a signal from a base station in a mobile communication system;

a first transceiver unit which transmits and receives a signal between the mobile station and the base station;

a second transceiver unit which transmits and receives a signal between the mobile station and a first mobile station;

network forming control means which forms a predetermined wireless network including the mobile station and the first mobile station by communicating with the first mobile station by using the second transceiver unit; and signal synthesizing means which synthesizes a signal received from the base station by the first transceiver unit and a signal destined for the mobile station received from the first mobile station by the second transceiver unit via the predetermined wireless network.

According to the mobile station, diversity reception can be performed when receiving a signal destined for itself from the base station, by synthesizing a signal from the base station and a signal destined for the mobile station received from another mobile station via the wireless network.

The above mobile station may further includes:

transfer control means which sends a signal destined for a second mobile station received by the first transceiver unit to the second mobile station via the predetermined wireless network by the second transceiver unit.

When the mobile station receives a signal destined for another mobile station from the base station, the mobile station transfers the signal to another mobile station via the predetermined wireless network. Accordingly, the another mobile station can perform diversity reception by synthesizing a signal received from the base station and the signal which is transferred.

In terms of providing a concrete function for performing diversity reception by using a signal from another mobile station, the above mobile station may further includes:

participation request send control means which sends a participation request to the first mobile station by the second transceiver unit via the predetermined wireless network, the participation request being a request to operate for diversity reception of the mobile station;

first storing means which stores the first mobile station as used for diversity reception of the mobile station when the second transceiver unit receives a participation response from the first mobile station via the predetermined wireless network, the participation response indicating that the first mobile station accepts the participation request;

wherein the signal synthesizing means synthesizes a signal received from the base station by the first transceiver unit and a signal destined for the mobile station received from the first mobile station by the second transceiver unit via the predetermined wireless network, the first mobile station being stored in the first storing means.

In terms of providing a concrete function for sending a signal used for diversity reception by another mobile station to the another mobile station, the above mobile station further includes:

first determining means which determines whether a signal from the base station can be received when the second transceiver unit receives a participation request from the second mobile station, the participation request being a request to operate for divinity reception of the second mobile station;

second storing means which stores the second mobile station when the first determining means determines that a signal from the base station can be received;

participation response control means which sends a participation response, to the second mobile station from which the participation request is received, by using the second transceiver unit via the predetermined wireless network, the participation response indicating that the mobile station accepts the participation request; and wherein the transfer control means sends, by the second transceiver unit, a signal destined for the second mobile station to the second mobile station when the first transceiver unit receives the signal destined for the second mobile station, the second mobile station being stored in the second storing means.

In addition, the above mobile station may further includes:

receive state measuring means which measures a state of receiving a signal from the base station when the second transceiver unit receives the participation request from the second mobile station via the predetermined wireless network;

second determining means which determines whether the state measured by the receive state measuring means is better than a predetermined state;

wherein the second mobile station which sends the participation request is stored in the second storing means and the participation response control means sends the participation response, by the second transceiver unit, to the second mobile station via the predetermined wireless network when the first determining means determines that a signal from the base station can be received and when the second determining means determines that the state is better than the predetermined state.

Further, in the above mobile station, the predetermined wireless network formed by the network forming control means may be a mobile ad-hoc network.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described with reference to figures.

Figure 1:
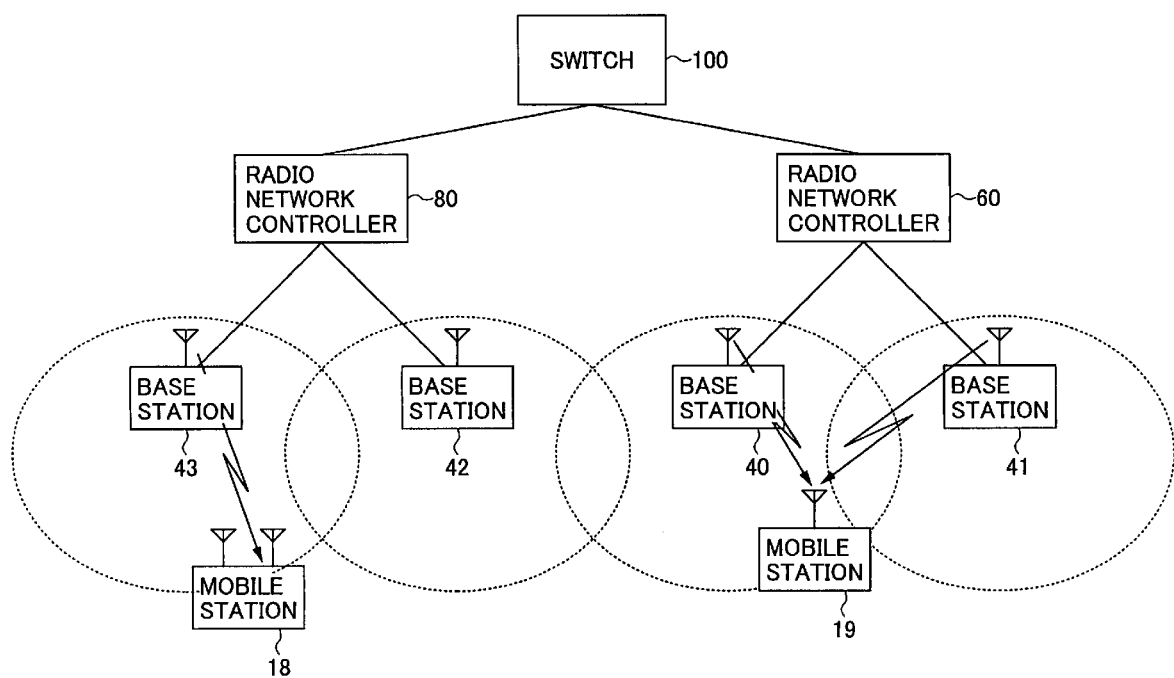
FIG. 1 shows an example of diversity reception in a conventional mobile communication system.
Figure 2:
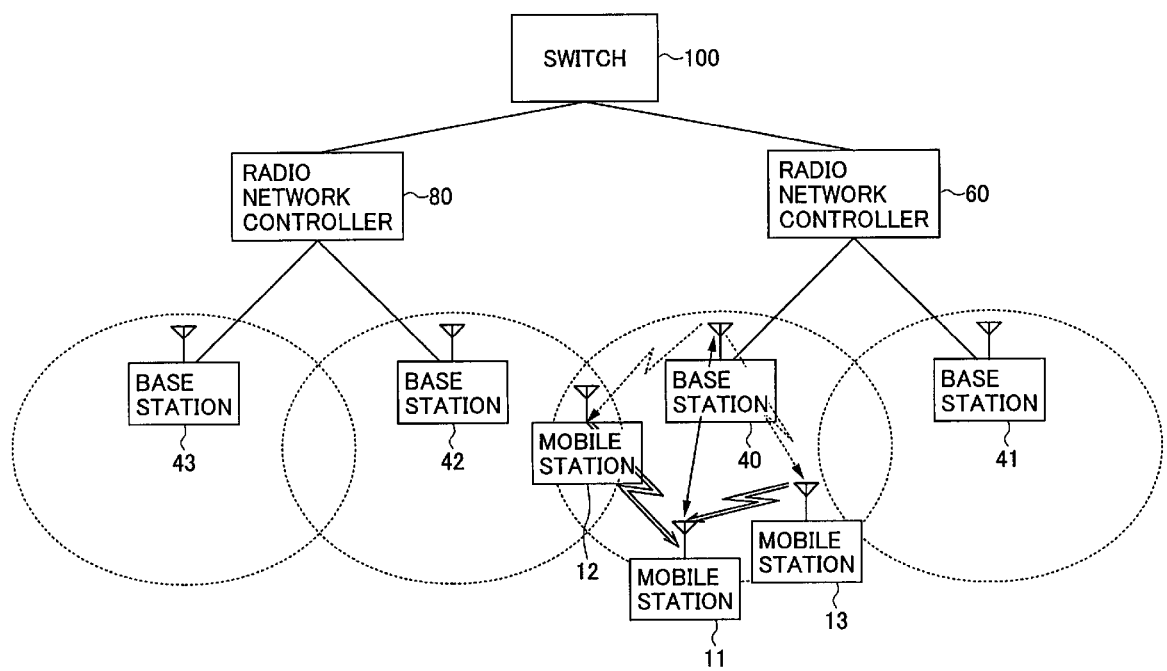
FIG. 2 shows a configuration of a mobile communication system according to an embodiment of the present invention.

A mobile communication system of an embodiment of the present invention is configured, for example, as shown in FIG. 2. This example is a cellular mobile communication system.

The mobile communication system shown in FIG. 2 is a cellular mobile communication system, in which a plurality of base stations 40, 41, 42, 43 which are placed in the communication service areas, radio network controllers 60, 80 and the switch 100 are connected hierarchically in the same way as the conventional communication system. Each base station forms a wireless zone (a cell). Each mobile station in a wireless zone of a base station communicates with the base station. For example, each of mobile stations which reside in the wireless zone of the base station 40 communicates with the base station 40 by using a predetermined wireless channel (which will be called a wireless channel for a cellular network). This is indicated in FIG. 2 by a solid line with arrows and dotted lines with arrows. In addition, the mobile stations 11, 12, 13 which reside in a predetermined area form a local wireless communication network, for example, a mobile ad-hoc network. The mobile stations 11, 12, 13 communicates with one another via the mobile ad-hoc network. This communication is shown in FIG. 2 by double solid lines with arrows.

Figure 3:
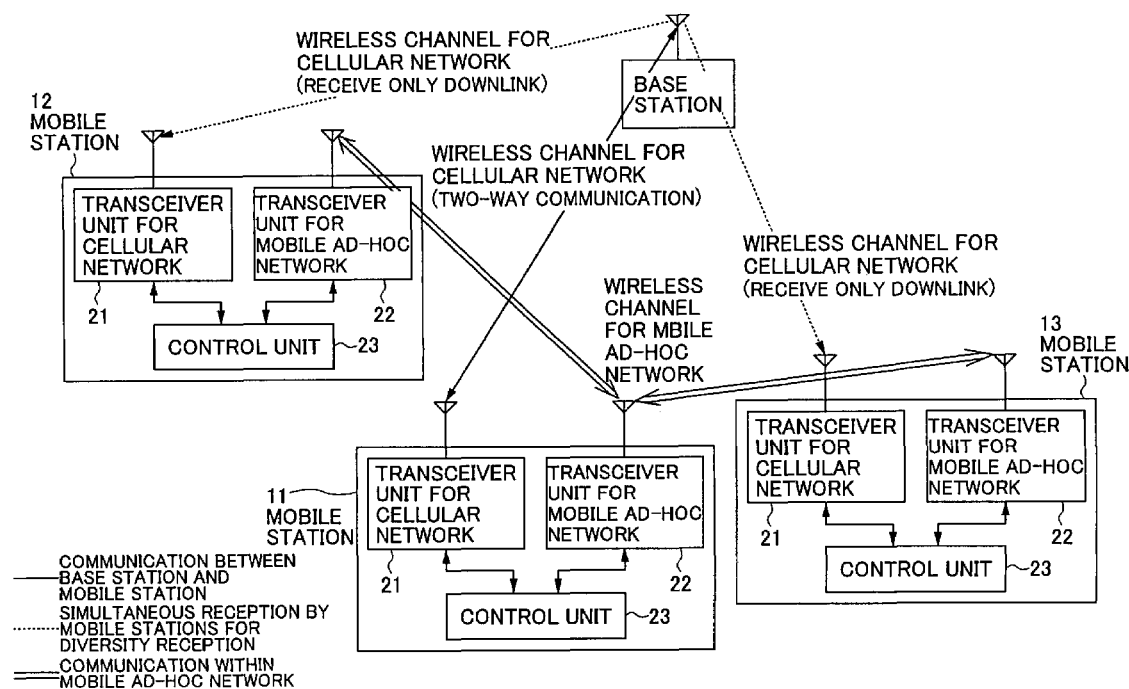
FIG. 3 shows configuration examples of each mobile station which communicates with a base station in the mobile communication system.

Each of the mobile stations 11, 12, 13 in the above-mentioned mobile communication system is configured, for example, as shown in FIG. 3.

As shown in FIG. 3, each of the mobile stations 11, 12, 13 includes a transceiver unit 21 for a cellular network, a transceiver unit 22 for a mobile ad-hoc network and a control unit 23. The transceiver unit 21 for a cellular network transmits a signal to the base station 40 and receives a signal from the base station 40. The transceiver unit 22 for a mobile ad-hoc network receives and transmits a signal within the mobile ad-hoc network formed by a mobile station group including the mobile stations 11, 12, 13 in a predetermined area. The control unit 23 controls the transceiver units 21 and 22. That is, for example, the control unit 23 performs a process of sending a signal received from the base station 40 by the transceiver unit 21 for a cellular network to another mobile station by the transceiver unit 22 for a mobile ad-hoc network, in addition, the control unit 23 synthesizes a signal received from the base station 40 by the transceiver unit 21 for a cellular network and a signal received from another mobile station by the transceiver unit 22 for a mobile ad-hoc network.

In this mobile communication system, the mobile station 11, for example, receives by diversity reception a signal from the base station 40 by using other mobile stations 12 and 13 (which will be called mobile stations for diversity reception) which reside in the wireless zone of the base station 40 and which reside in the mobile ad-hoc network in the following way.

The transceiver unit 21 for a cellular network of the mobile station 11 performs two-way communication with the base station 40 by using a predetermined wireless channel for a cellular network so that the transceiver unit 21 receives a signal destined for the mobile station 11. The transceiver unit 21 of each of the mobile stations 12 and 13 for diversity reception receives a downlink signal destined for the mobile station 11. Then, the control unit 23 of each of the mobile stations 12 and 13 passes the received signal destined for the mobile station 11 to the transceiver unit 22 for a mobile ad-hoc network. The transceiver unit 22 for a mobile ad-hoc network sends the received signal destined for the mobile station 11 to the mobile station 11 via the mobile ad-hoc network. When the transceiver unit 22 for a mobile ad-hoc network of the mobile station 11 receives the signals destined for the mobile station 11 from the mobile station 12 and 13, the control unit 23 synthesizes the signal received from the base station 40 and the signals received from the mobile stations 12 and 13.

In the following, the operation of the diversity reception of the mobile station 11 by using the mobile stations 12 and 13 for diversity reception will be described in more detail.

The process for determining other mobile stations as the mobile stations for diversity reception concerning the mobile station 11 is as follows, for example.

Figure 4:
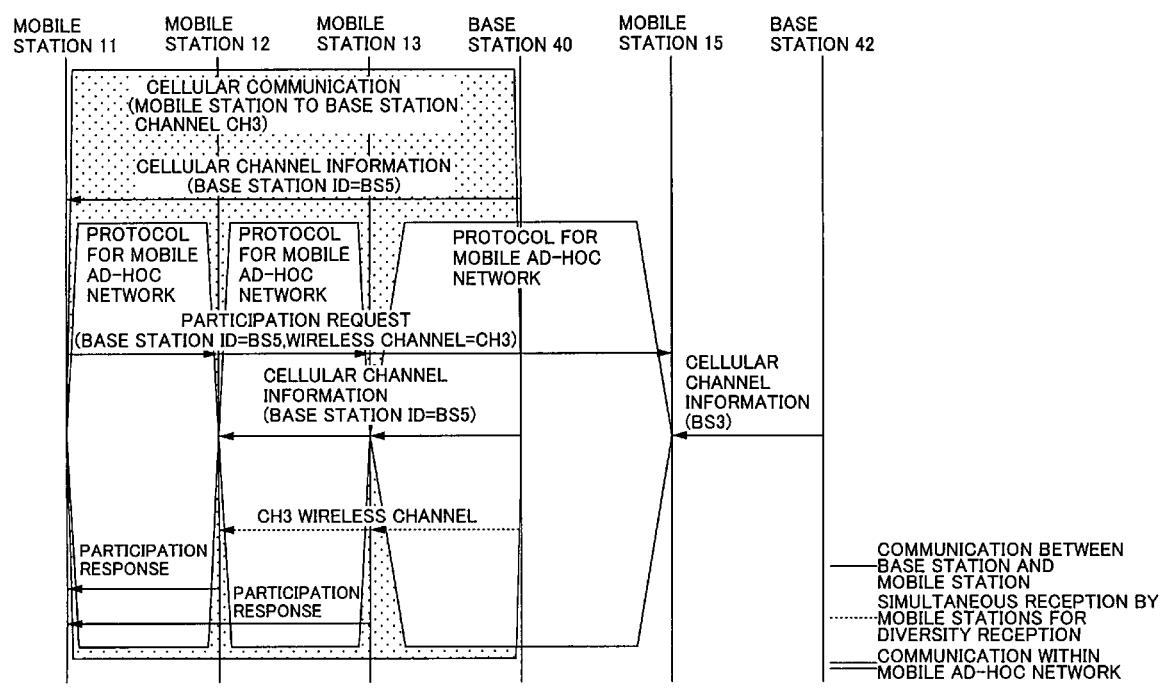
FIG. 4 is a sequence chart which shows process procedures for deciding mobile stations for diversity reception.
Figure 5:
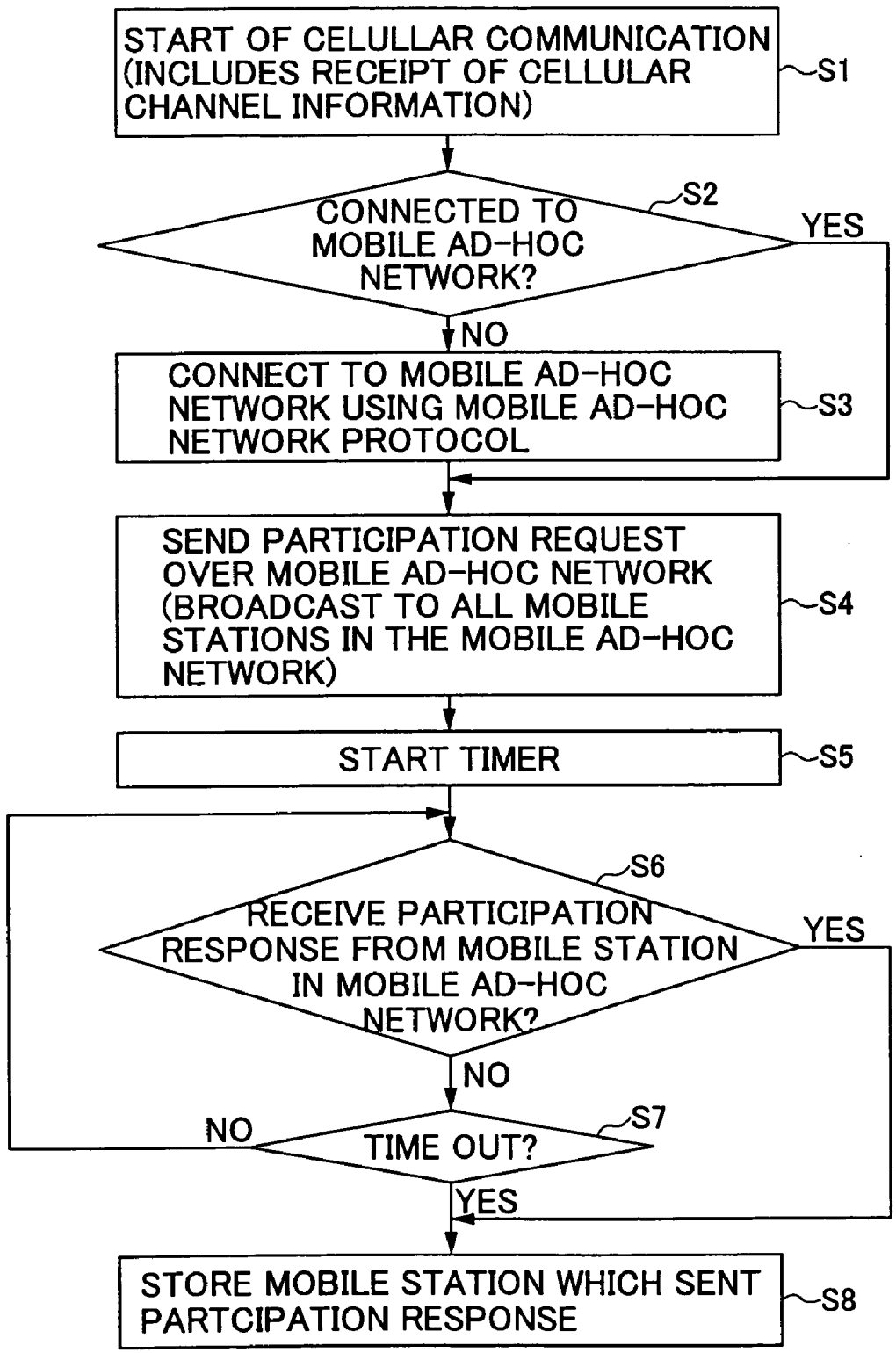
FIG. 5 is a flowchart showing an example of a process procedure in a mobile station for deciding mobile stations for diversity reception.
Figure 9:
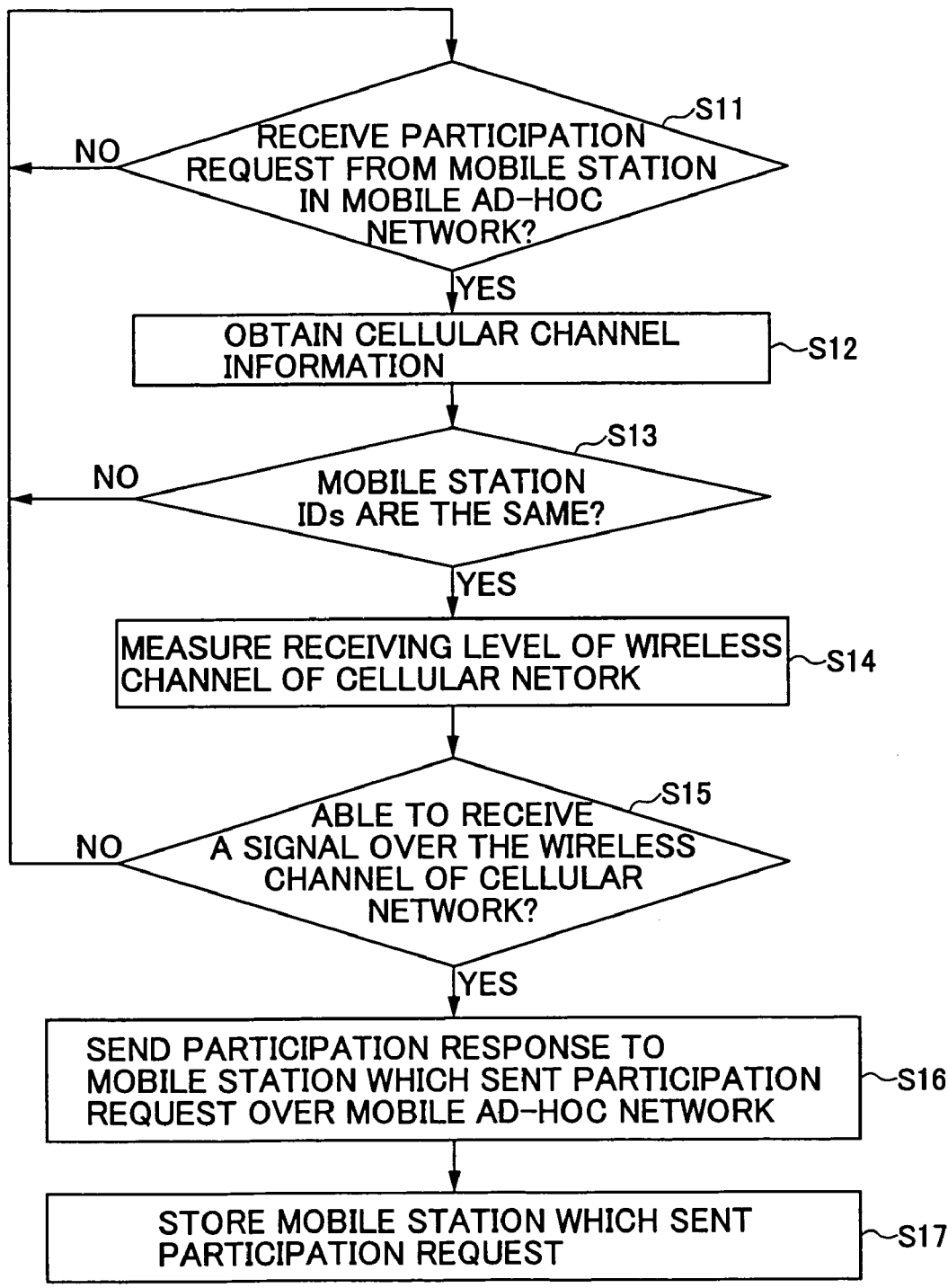
FIG. 9 is a flowchart showing an example of a process procedure in a mobile station which receives the request to participate in mobile stations for diversity reception.

Process procedures of the mobile stations 11, 12, 13 and the base station 40 are shown in FIG. 4. A process procedure of the control unit 23 of the mobile stations 11 is shown in FIG. 5. A process procedure of the control unit 23 of the other mobile stations 12 and 13 is shown in FIG. 9.

The operations of the mobile stations 11, 12, 13 will be described according to FIGS. 5 and 9 with reference to FIG. 4 generally.

Figure 6:
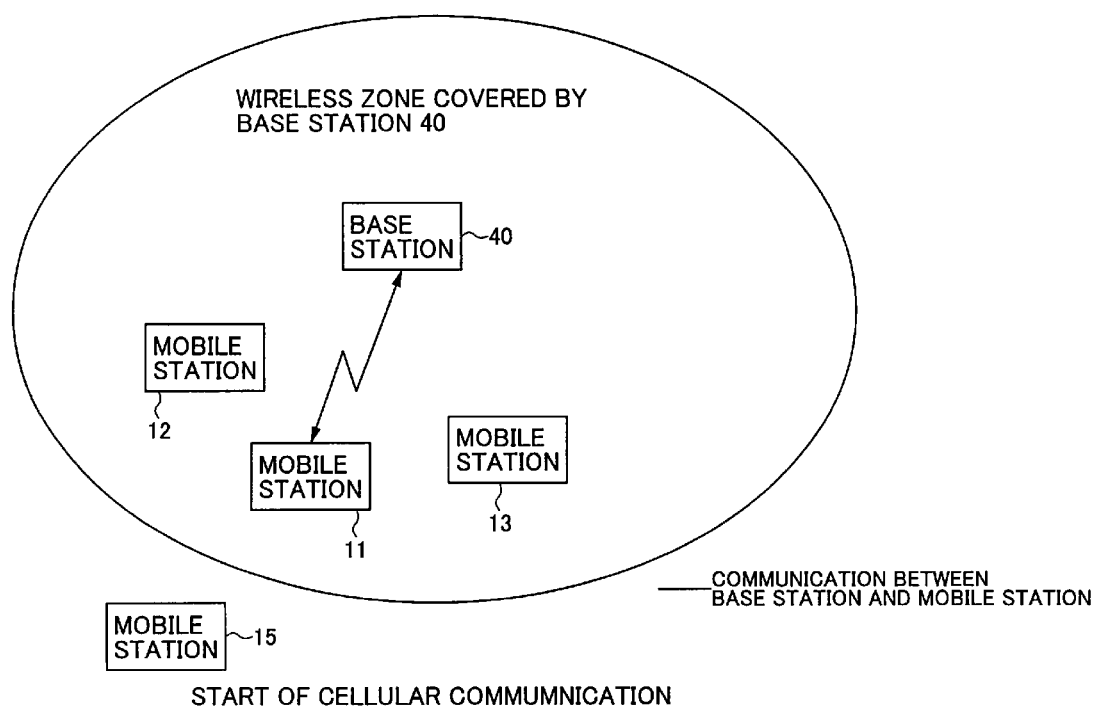
FIG. 6 shows a state at the time when cellular communication between a mobile station and a base station starts.

In FIG. 5, the mobile station 11 starts cellular communication with the base station 40 in step 1. FIG. 6 shows this state. This communication between the mobile station 11 and the base station 40 is performed, for example, on a wireless channel CH3 (a wireless channel for a cellular network) wherein cellular channel information including an ID (for example ID=BS5) of the base station 40 is sent from the base station 40 to the mobile station 11.

Figure 7:
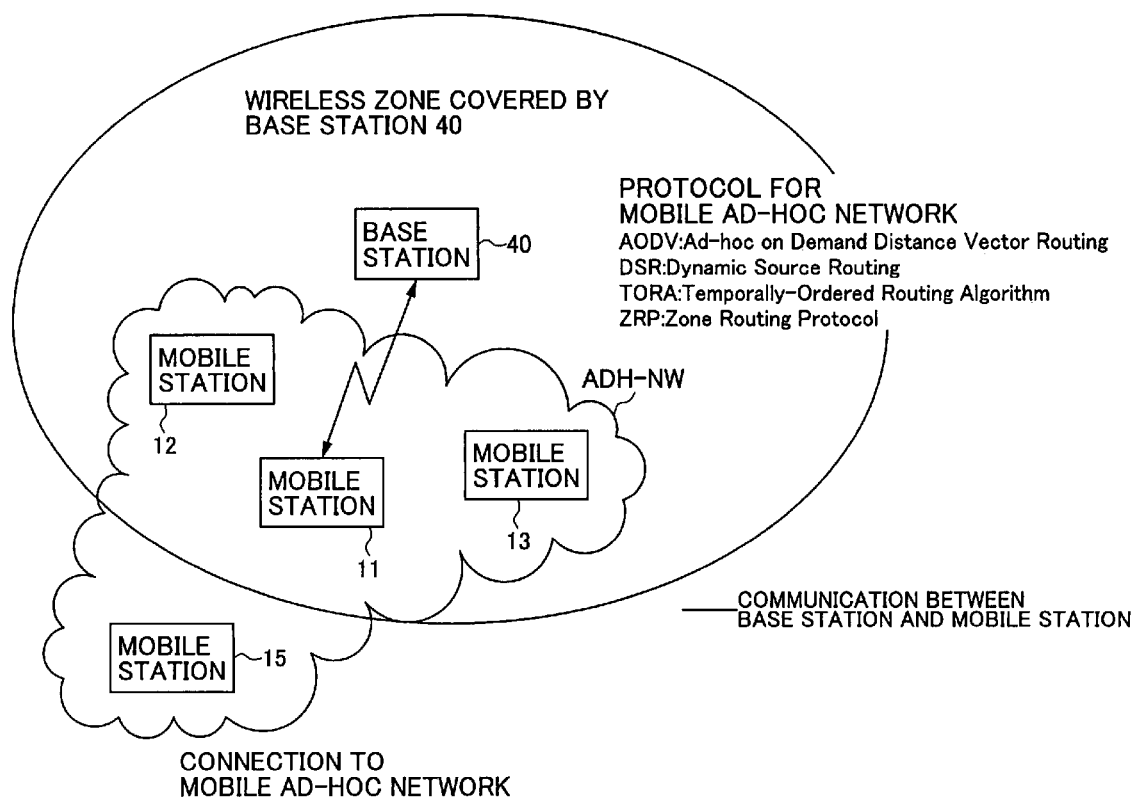
FIG. 7 shows a state in which a mobile ad-hoc network is formed by a plurality of mobile stations.

After starting the cellular communication with the base station 40, the mobile station 11 determines whether the mobile station 11 is connected to the mobile ad-hoc network in step 2. If the mobile station 11 is not connected to the mobile ad-hoc network, the transceiver unit 22 for a mobile ad-hoc network transmits and receives a signal according to a predetermined protocol of a mobile ad-hoc network so that the mobile station 11 is connected to, for example, a mobile ad-hoc network ADH-NW including mobile stations 12, 13, 15 in step 3. This state is shown in FIG. 7. AODV (Ad-hoc on Demand Distance Vector Routing), DSR (Dynamic Source Routing), TORA (Temporally-Ordered Routing Algorithm), ZRP (Zone Routing Protocol) and the like can be used as the protocol for the mobile ad-hoc network.

Figure 8:
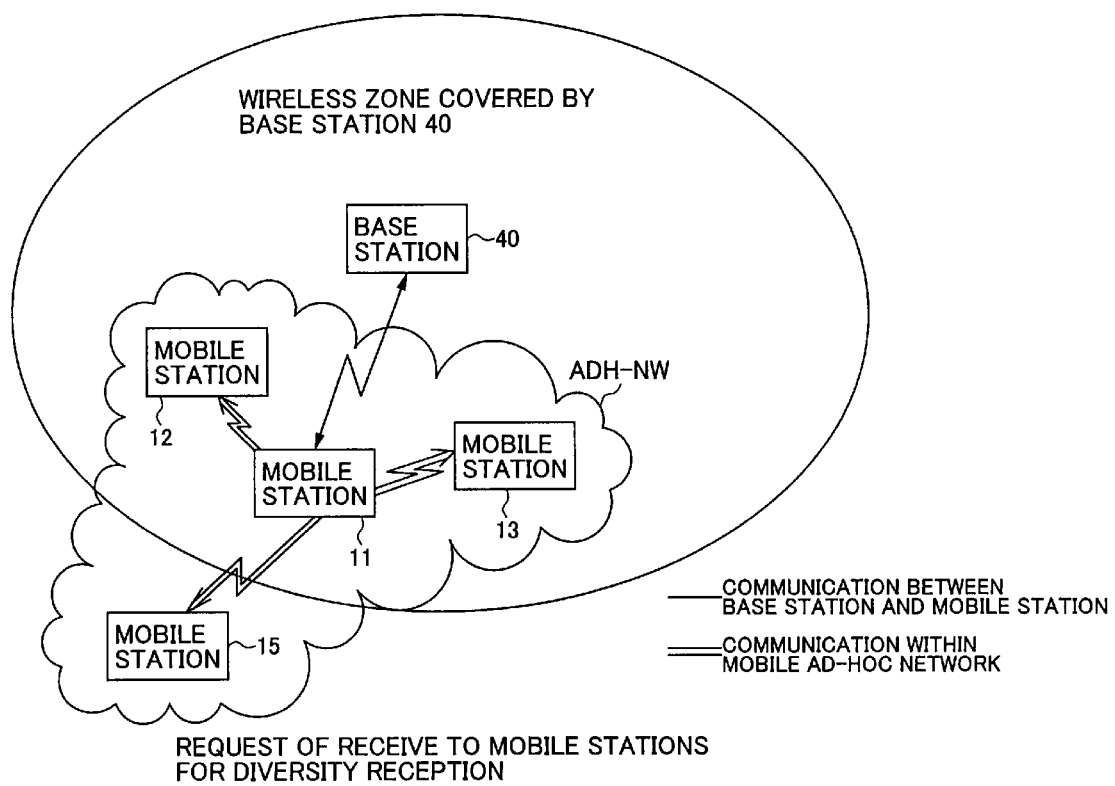
FIG. 8 shows a state in which a mobile station sends, to other mobile stations, requests to participate in mobile stations for diversity reception.

Accordingly, when the mobile station 11 is connected to the mobile ad-hoc network ADH-NW, or, if the mobile station 11 is already connected to the mobile ad-hoc network ADH-NW (YES in step 2), the mobile station 11 sends a participation request to the mobile ad-hoc network ADH-NW in step 4. This state is shown in FIG. 8. A signal used for the participation request includes cellular channel information (the ID (=BS5) of the base station 40 and the wireless channel CH3 used for communication with the base station 40) from the base station 40.

The mobile station 11 starts an internal timer in step 5 after sending the participation request for diversity reception over the mobile ad-hoc network ADH-NW. Then, the mobile station 11 determines repeatedly whether it receives a participation response from other mobile station in the mobile ad-hoc network ADH-NW in step 6 while checking whether the timer times out in step 7.

In order for the other mobile station (for example, the mobile station 12, 13) to recognize the participation request from the mobile station 11, the other mobile station needs to know identifying information of the mobile station 11. When the mobile ad-hoc network ADH-NW uses the same identifying information as that of the cellular network, the other mobile station uses source information (mobile station number of the source mobile station and the like) in a header of the participation request as the identifying information of the mobile station 11. When the mobile ad-hoc network ADH-NW uses different identifying information from that of the cellular network, the identifying information is included in a part (other than the header part) of the participation request in addition to "base station ID" and "wireless channel".

The other mobile stations 12, 13, 15 in the mobile ad-hoc network operate according to FIG. 9.

As shown in FIG. 9, each mobile station repeatedly determines whether it receives the participation request from a mobile station in the mobile ad-hoc network ADH-NW in step 11. When the mobile station receives the participation request from the mobile station 11, the mobile station obtains the cellular channel information included in the participation request in step 12. Then, the mobile station determines whether a base station ID which the mobile station receives from a base station and a base station ID included in the participation request are the same in step 13. In this embodiment, since the mobile stations 12 and 13 reside in the wireless zone of the base station 40, it is determined that these base station IDs are the same by the mobile stations 12 and 13. On the other hand, since the mobile station 15 is in a wireless zone of, for example, a base station 42 (ID=BS3), the mobile station 15 determines that these base station IDs are not the same.

After that, the mobile station 15 which determines that these base station IDs are not the same repeatedly determines whether the mobile station 15 receives the participation request from a mobile station in the mobile ad-hoc network ADH-NW in step 11 (waiting state).

On the other hand, the mobile station 12 or 13 which determines that these mobile station IDs are the same measures a receiving level of the wireless channel CH3 used by the base station 40 in the cellular network in step 14. Then, the mobile station determines whether a signal can be received by the wireless channel CH3 on the basis of the receiving level in step 15. In this determination, for example, it is judged whether the receiving level is equal to or more than a threshold level. When it is determined that a signal can not be received by the wireless channel CH3, the mobile station repeatedly determines whether it receives the participation request from a mobile station in the mobile ad-hoc network ADH-NW in step 11 (waiting state).

When it is judged that a signal can be received by the wireless channel CH3, the mobile station sends the participation response to the mobile station 11 which sent the participation request over the mobile ad-hoc network in step 16. Then, the control unit 23 of the mobile station which sends the participation response stores the mobile station 11 which sent the participation request in step 17. Accordingly, each mobile station which sent the participation response recognizes that it performs as the mobile station for the diversity reception for the mobile station 11 which sent the participation request.

Figure 10:
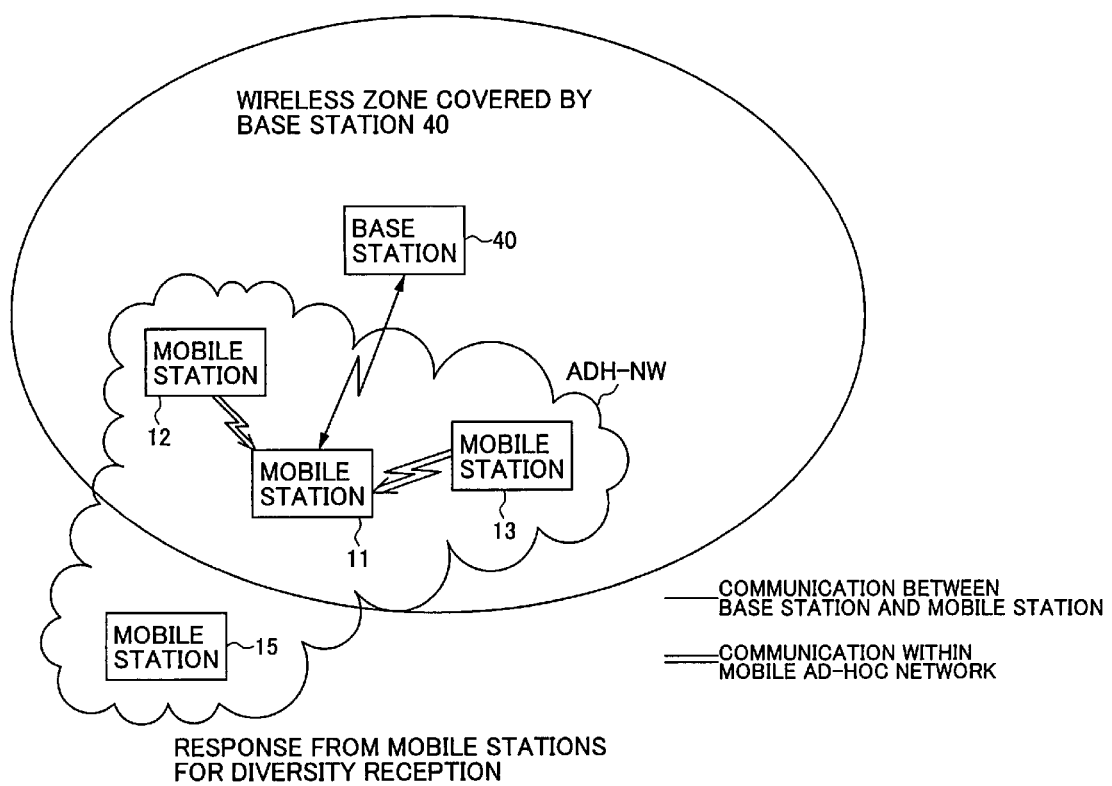
FIG. 10 shows a state in which the mobile station which receives the request to participate sends a response.

In this example, the mobile stations send the participation response in response to the participation request from the mobile station 11, however the mobile station 15 does not send the participation response. This state is shown in FIG. 10.

As shown in FIG. 5, as mentioned above, the mobile station 11 which sent the participation request to the mobile ad-hoc network ADH-NW repeatedly determines whether the participation response is sent from other mobile station in the mobile ad-hoc network in step 6 while checking whether the inside timer times out in step 7. In this state, when the mobile station 11 receives the participation responses from other mobile stations, for example mobile stations 12 and 13, the control unit 23 in the mobile station 11 stores the mobile stations 12 and 13 which sent the participation responses. Accordingly, the mobile station 11 recognizes that the mobile stations 12 and 13 operate as mobile stations for diversity reception for the mobile station 11.

When the other mobile stations 12 and 13 which operate as the mobile stations for diversity reception for the mobile station 11 are determined, the mobile station 11 receives signals from the base station 40 by diversity reception. In the following, processes in the diversity reception will be described.

Figure 11:
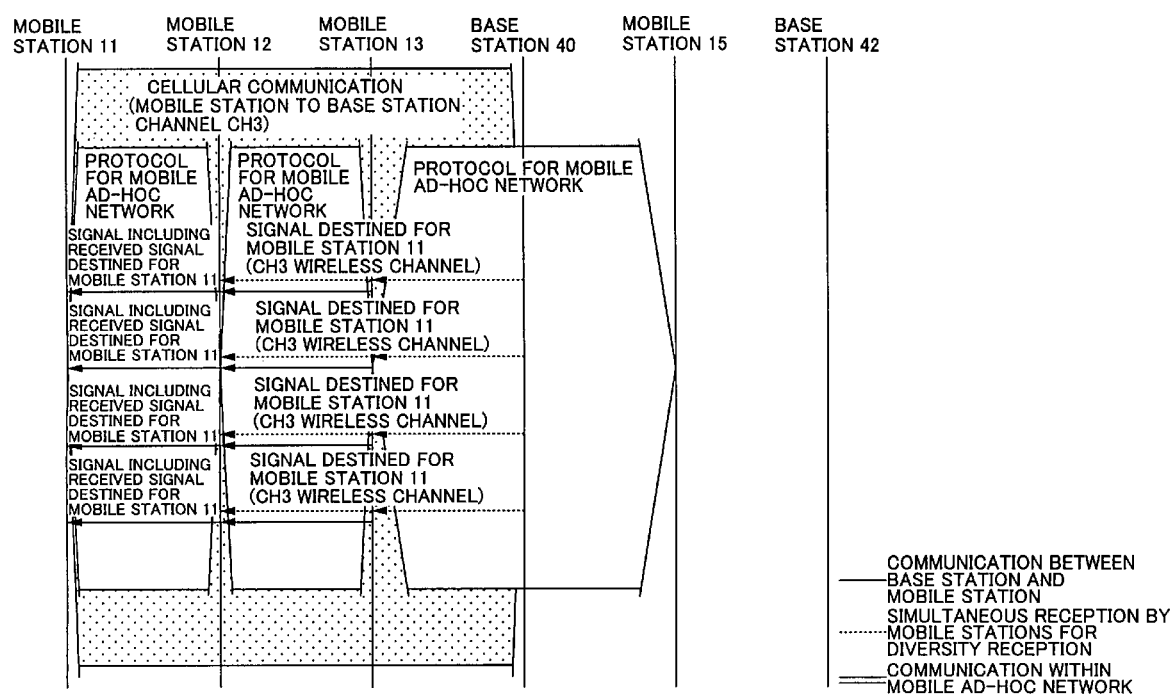
FIG. 11 is a sequence chart showing an example of process procedures in which a mobile station receives a signal from the base station by using mobile stations for diversity reception.
Figure 12:
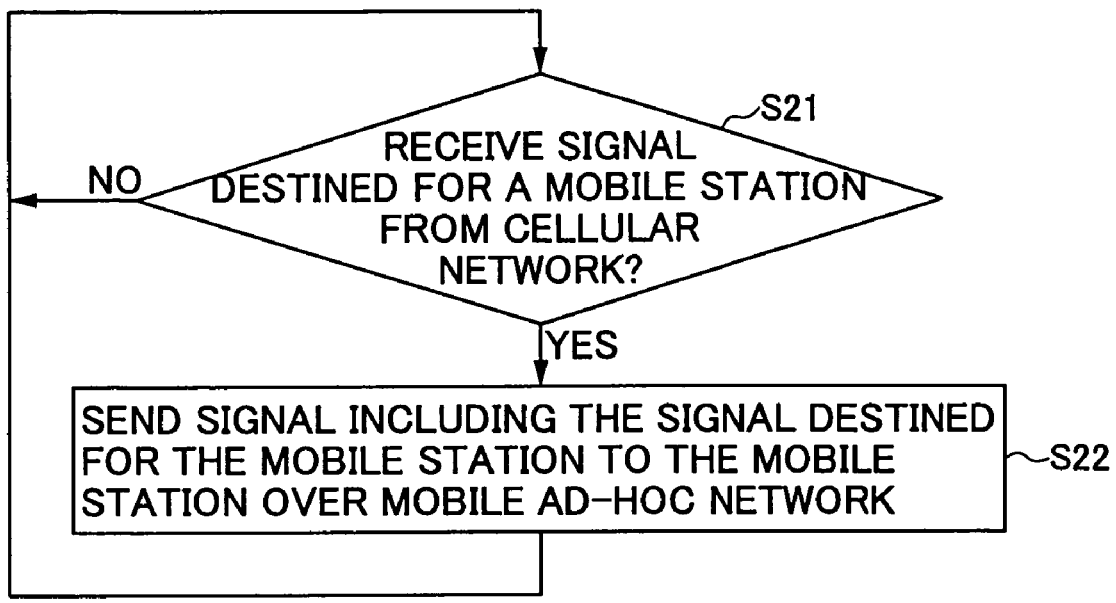
FIG. 12 is a flowchart showing an example of a process procedure in a mobile station which operate as the mobile station for diversity reception.
Figure 13:
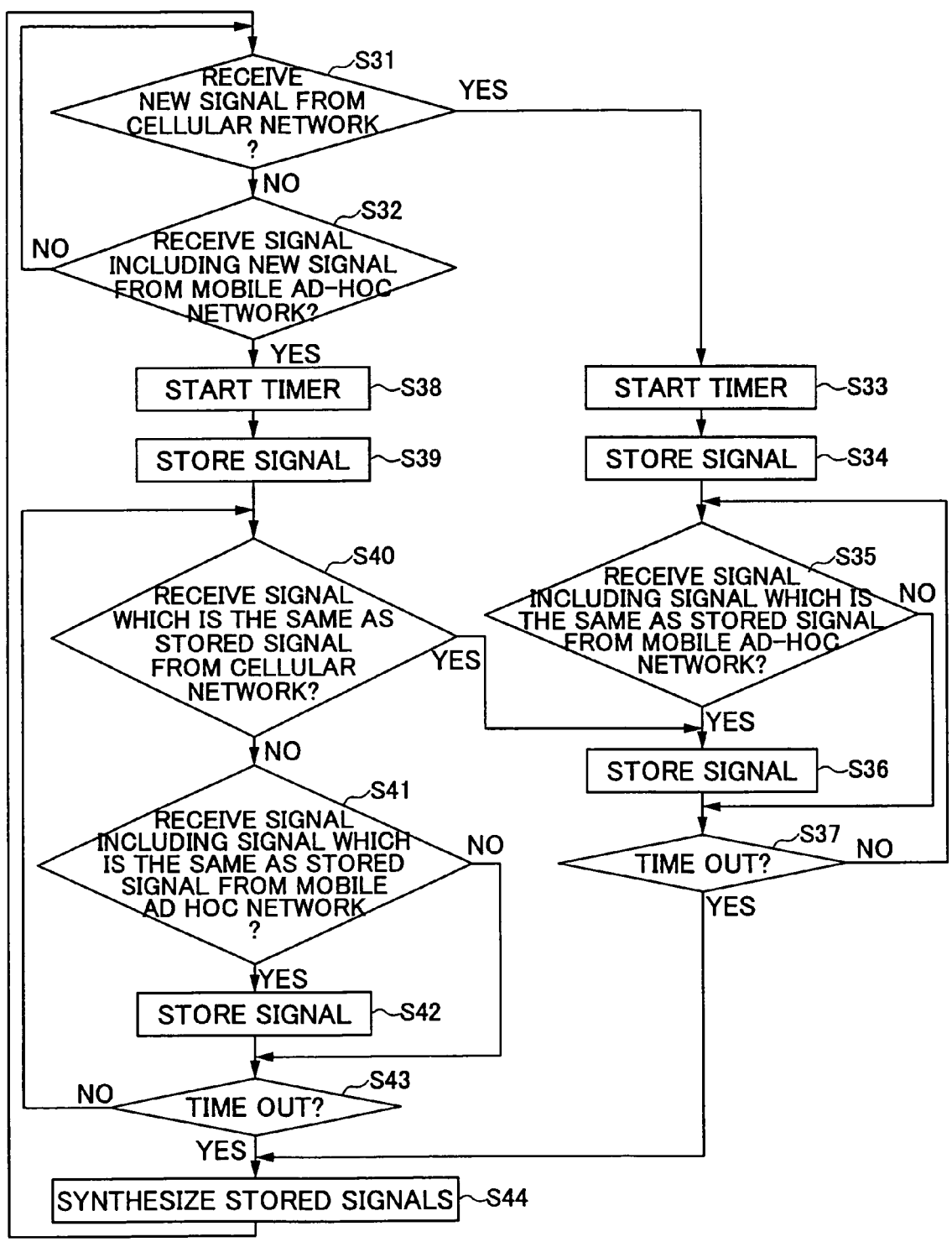
FIG. 13 is a flowchart showing an example of a process procedure in a mobile station which receives a signal from the base station by diversity reception by using mobile stations for diversity reception.

FIG. 11 shows process procedures in each of mobile stations 11, 12, 13 and the base station 40. FIG. 12 shows process procedures in each of the mobile stations 12 and 13 which operate as the mobile stations for diversity reception. FIG. 13 shows a process procedure in the mobile station 11.

In the following, processes in each of the mobile stations 12, 13, 11 will be described according to FIGS. 12 and 13 with reference to FIG. 11 generally.

As shown in FIG. 12, each of the mobile stations 12 and 13 which operate as the mobile station for diversity reception enter a state in which the mobile stations 12 and 13 receive data from the wireless channel CH3 of the base station 40, wherein each of the mobile stations 12 and 13 monitors by the transceiver unit 21 for a cellular network whether a signal (for example, a packet) destined for the mobile station 11 is received in step 21. When the mobile station receives a signal destined for the mobile station 11 by the wireless channel CH3, the mobile station sends, by the transceiver unit 22 for a mobile ad-hoc network, a signal including the received signal destined for the mobile station 11 to the mobile station 11 over the mobile ad-hoc network ADH-NW in step 22. Each of the mobile stations 12 and 13 repeatedly performs these processes (steps 21 and 22).

A method for the mobile stations 12 and 13 to check whether the signal received via the wireless channel for a cellular network is destined for the mobile station 11 is as follows, for example.

Generally, a signal (a packet, for example) transmitted over a wireless channel in a cellular network includes identifying information of a destination mobile station (for example, a mobile station number and a mobile station address). Further, the signal also includes error correction code and error detection code. These error correction code and error detection code are used for correcting a bit error in the signal which occurs while the signal is transmitted over the wireless channel and used for determining whether the correction is properly performed by a mobile station which received the signal. The mobile stations 12 and 13 check whether there is a bit error in the identifying information of the signal received by the wireless channel of the cellular network by using the error correction code and error detection code. When there is a bit error, the signal is discarded. On the other hand, when there is no error in the identifying information, the mobile stations 12 and 13 determines whether the identifying information is for the mobile station 11. If the identifying information is for the mobile station 11, the signal including the identifying information is determined to be destined for the mobile station 11.

As shown in FIG. 13, the mobile station 11 which performs diversity reception monitors whether it receives a new signal (for example, a packet) from the wireless channel of the mobile station 40 in step 31, and whether it receives a new signal (for example, a packet) from the mobile ad-hoc network ADH-NW in step 32. When a new signal is received from the wireless channel CH3 of the base station 40, the control unit 23 of the mobile station 11 starts the internal timer in step 33 and stores the received signal in an internal memory in step 34. Then, the mobile station 11 determines whether it receives, from the mobile ad-hoc network ADH-NW, a signal which includes a signal same as that which is stored in the internal memory in step 35 while checking whether the timer times out in step 37.

Then, when the mobile station 11 receives a signal including a signal which is the same as the stored signal from the mobile stations 12 and 13 via the mobile ad-hoc network ADH-NW, the mobile station 11 stores the signal in the internal memory in step 36.

While the above-mentioned processes (steps 35, 36, 37) are performed, if the internal timer times out, the signal which is received from the base station 40 and stored in the internal memory, and, the signal received from other mobile stations 12, 13 via the mobile ad-hoc network ADH-NW are synthesized in step 44. This process is performed by a known method, for example, in which blocks except for a block where an error is detected are selected and combined, and by a maximum ration synthesizing method and the like.

As mentioned above, while the mobile station 11 monitors whether it receives a new signal (for example, a packet) from the wireless channel CH3 of the base station 40 (in step 31) and whether it receives a new signal (for example, a packet) from the mobile ad-hoc network ADH-NW (in step 32), there is a case in which the mobile station 11 receives a new signal from the mobile ad-hoc network ADH-NW before it receives a new signal from the wireless channel CH3 of the base station 40 (NO in step 31, YES in step 32). In this case, the internal timer is started in step 38, and the new signal received via the mobile ad-hoc network ADH-NW is stored in the internal memory in step 39.

After that, while checking time-out of the internal timer in step 43, the mobile station 11 monitors whether it receives the same signal as the stored signal from the wireless channel CH3 of the base station 40 in step 40 and whether it receives the same signal as the stored signal from the mobile ad-hoc network ADH-NW in step 41. In this process, when the same signal is received via the mobile ad-hoc network ADH-NW (No in step 40, YES in step 41), the signal is stored in the internal memory in step 42.

On the other hand, when the same signal is received via the wireless channel CH3 of the base station 40 (YES in step 40), the signal is stored in the internal memory in step 36. After that, while checking time-out of the internal timer in step 37, the mobile station 11 monitors whether it receives a signal same as the signals stored so far via the mobile ad-hoc network ADH-NW in step 35. Then, when the signal is received via the mobile ad-hoc network, the signal is stored in the internal memory in step 36.

In the above-mentioned processes (in steps 40, 41, 42, 43, or in steps 35, 36, 37), when the internal timer times out, signals destined for the mobile station 11 which are stored in the above-mentioned way are synthesized in step 44.

Figure 14:
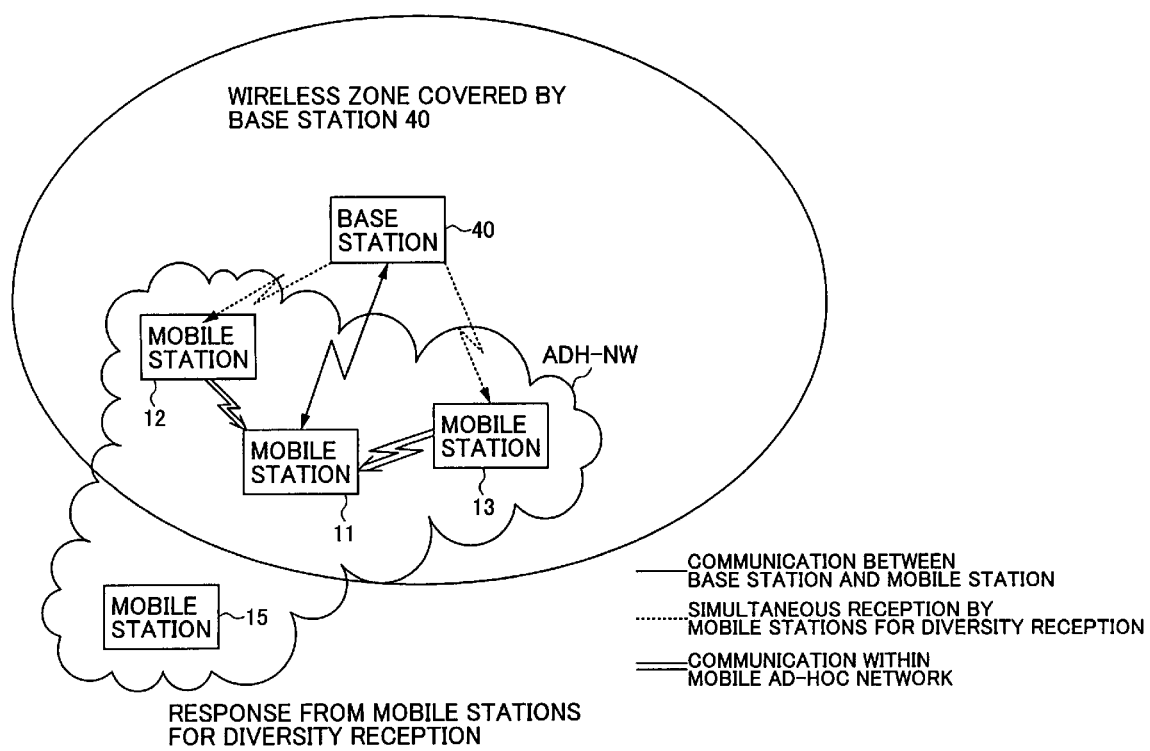
FIG. 14 shows a state in which a mobile station receives a signal from the base station by diversity reception by using mobile stations for diversity reception.

FIG. 14 shows a sate in which the mobile station 11 receives a signal from the base station 40 by using the mobile stations 12 and 13 which operate as the mobile stations for diversity reception in the above-mentioned way.

In the above-mentioned mobile communication system, since signals destined for the mobile station 11 which are received by the mobile stations 12 and 13 via the wireless channel CH3 of the base station 40 are aggregated in the mobile station 11 via the mobile ad-hoc network ADH-NW, the mobile station 11 can receive a signal destined for itself by diversity reception. In addition, since mobile stations, in the mobile ad-hoc network, which can receive signals via the wireless channel of the base station 40 in good condition are selected dynamically as the mobile station for diversity reception, the mobile station which performs diversity reception can always obtain a receiving signal of lower error rate.

Further, since the mobile station for diversity reception can be selected among any mobile stations which can communicate with the base station, good diversity reception which is unaffected by a location of the base station becomes possible.

As mentioned above, according to the present invention, since diversity reception is performed by receiving signals from the base station by using one or a plurality of other mobile stations which can communicate with the base station, a mobile station which moves in a communication service area can always receive a signal destined for the mobile station itself wherever the mobile station is located. Therefore, effective diversity reception is always possible for the mobile station without being influenced by the size of the mobile station or the location of the base station.

Further, according to the present invention, a mobile station which can communicate with other mobile stations according to the above-mentioned communication method can be provided.

The present invention is not limited to the specifically disclosed embodiments, and variations and modifications may be made without departing from the scope of the invention.

What is claimed is:

1. A communication method used when a mobile station receives a signal from a base station in a mobile communication system, comprising the steps of:
    said mobile station deciding on one or a plurality of mobile stations which can communicate with said mobile station via one or a plurality of wireless networks that include said mobile station and said one or a plurality of mobile stations, and that do not include said base station, wherein said one or a plurality of mobile stations can receive a signal from said base station;
    said one or a plurality of mobile stations sending a signal destined for said mobile station received from said base station to said mobile station via said one or a plurality of wireless networks; and
    said mobile station synthesizing a signal received from said base station and said signal destined for said mobile station received from said one or a plurality of mobile stations.

2. The communication method as claimed in claim 1, further comprising the steps of:
    forming said one or a plurality of wireless networks by said mobile station and other mobile stations in said mobile communication system;
    selecting said one or a plurality of mobile stations among said other mobile stations as mobile stations for diversity reception; and
    said one or a plurality of mobile stations selected as used for diversity reception of said mobile station sending said signal destined for said mobile station received from said base station to said mobile station via said one or a plurality of wireless networks.

3. The communication method as claimed in claim 2, further comprising the steps of:
    selecting said one or a plurality of mobile stations among said other mobile stations such that communication condition between said one or a plurality of mobile stations and said base station is better than predetermined condition.

4. The communication method as claimed in claim 3, further comprising the steps of:
    selecting said one or a plurality of mobile stations among said other mobile stations such that each level of signals received from said base station by said one or a plurality of mobile stations is higher than a predetermined level.

5. The communication method as claimed in claim 2, further comprising the steps of:
    said mobile station sending participation requests which are requests to operate for diversity reception of said mobile station, to said one or a plurality of mobile stations via said one or a plurality of wireless networks;
    each mobile station which receives said participation request determines whether said each mobile station can receive a signal from said base station;
    each mobile station which can receive a signal from said base station recognizing that said each mobile station operates for diversity reception of said mobile station which sends said participation request, and sending a participation response which indicates acceptance of said participation request to said mobile station via said one or a plurality of wireless networks; and
    said mobile station recognizing that said each mobile station which sends said participation response operates for diversity reception of said mobile station.

6. The communication method as claimed in claim 5, further comprising the steps of:
    said each mobile station which receives said participation request measuring a state of receiving a signal from said base station;
    said each mobile station in which said state is better than a predetermined state recognizing that said each mobile station operate for diversity reception of said mobile station and sending said reception response to said mobile station via said one or a plurality of wireless networks.

7. The communication method as claimed in claim 1, wherein said one or a plurality of wireless networks is a mobile ad-hoc network.

8. A mobile station which receives a signal from a base station in a mobile communication system, comprising:
    a first transceiver unit which transmits and receives a signal between said mobile station and said base station;
    a second transceiver unit which transmits and receives a signal between said mobile station and a first mobile station; network forming control means which forms a one or a plurality of wireless networks including said mobile station and at least said first mobile station, but not said base station by communicating with said first mobile station by using said second transceiver unit; and
    signal synthesizing means which synthesizes a signal received from said base station by said first transceiver unit and a signal destined for said mobile station received from said first mobile station by said second transceiver unit via said one or a plurality of wireless networks.

9. The mobile station as claimed in claim 8, further comprising;
    transfer control means which sends a signal destined for a second mobile station received by said first transceiver unit to said second mobile station via said one or a plurality of wireless networks by said second transceiver unit.

10. The mobile station as claimed in claim 9, further comprising:

first determining means which determines whether a signal from said base station can be received when said second transceiver unit receives a participation request from said second mobile station, said participation request being a request to operate for diversity reception of said second mobile station; second storing means which stores said second mobile station when said first determining means determines that a signal from said base station can be received;

participation response control means which sends a participation response, to said second mobile station from which said participation request is received, by using said second transceiver unit via said one or a plurality of wireless networks, said participation response indicating that said mobile station accepts said participation request; and wherein said transfer control means sends, by said second transceiver unit, a signal destined for said second mobile station to said second mobile station when said first transceiver unit receives said signal destined for said second mobile station, said second mobile station being stored in said second storing means.

11. The mobile station as claimed in claim 10, further comprising:

receive state measuring means which measures a state of receiving a signal from said base station when said second transceiver unit receives said participation request from said second mobile station via said one or a plurality of wireless networks;

second determining means which determines whether said state measured by said receive state measuring means is better than a predetermined state;

wherein said second mobile station which sends said participation request is stored in said second storing means and said participation response control means sends said participation response, by said second transceiver unit, to said second mobile station via said one or a plurality of wireless networks when said first determining means determines that a signal from said base station can be received and when said second determining means determines that said state is better than said predetermined state.

12. The mobile station as claimed in claim 8, further comprising:

participation request send control means which sends a participation request to said first mobile station by said second transceiver unit via said one or a plurality of wireless networks, said participation request being a request to operate for diversity reception of said mobile station;

first storing means which stores said first mobile station as used for diversity reception of said mobile station when said second transceiver unit receives a participation response from said first mobile station via said one or a plurality of wireless networks, said participation response indicating that said first mobile station accepts said participation request;

wherein said signal synthesizing means synthesizes a signal received from said base station by said first transceiver unit and a signal destined for said mobile station received from said first mobile station by said second transceiver unit via said one or a plurality of wireless networks, said first mobile station being stored in said first storing means.

13. The mobile station as claimed in claim 8, wherein said one or a plurality of wireless networks formed by said network forming control means is a mobile ad-hoc network.

* * * * *